United States Patent [19]

Anton et al.

[11] 4,362,588
[45] Dec. 7, 1982

[54] METHOD OF FABRICATING A DUCTED BLANKET FOR A ROTOR SPAR

[75] Inventors: John C. Anton, Trumbull; Edward J. Bush, Easton, both of Conn.

[73] Assignee: The United States of America as represented by the Secretary of the Army, Washington, D.C.

[21] Appl. No.: 297,643

[22] Filed: Aug. 31, 1981

Related U.S. Application Data

[63] Continuation-in-part of Ser. No. 169,590, Jul. 17, 1980, abandoned.

[51] Int. Cl.³ .................. B23P 15/04; B32B 31/20
[52] U.S. Cl. .................. 156/219; 156/222; 156/286; 156/289; 156/306.9; 156/323; 156/382
[58] Field of Search ............ 156/219, 221, 222, 286, 156/289, 306.9, 307.7, 382, 323

[56] References Cited

U.S. PATENT DOCUMENTS

| | | | |
|---|---|---|---|
| 2,680,700 | 6/1954 | Meyers | 156/219 |
| 3,303,081 | 2/1971 | Michaelson et al. | 156/219 |
| 3,405,019 | 10/1968 | Seil et al. | 156/286 |
| 3,423,261 | 1/1969 | Frantzen | 156/644 |
| 3,662,050 | 5/1972 | Willett | 156/221 |
| 3,681,171 | 8/1973 | Hojo et al. | 156/286 |
| 3,932,249 | 1/1976 | Jury et al. | 156/286 |
| 3,997,696 | 12/1976 | Jaisle et al. | 156/219 |
| 4,154,882 | 5/1979 | Ungar et al. | 156/219 |
| 4,175,162 | 11/1979 | DeBoel et al. | 156/286 |
| 4,223,429 | 9/1980 | Robinson | 156/222 |

Primary Examiner—Jerome W. Massie
Attorney, Agent, or Firm—Nathan Edelberg; Robert P. Gibson; Norman L. Wilson, Jr.

[57] ABSTRACT

A method for fabricating an impervious fiberglass blanket having a plurality of spaced-apart slots on its inner side, such as for overlaying and venting a pressurized helicopter rotor spar, includes the steps of positioning a thin metal forming grid of spaced-apart strips, corresponding to the desired slots, on a forming table over a sacrificial layer of peelable material. Sheets of resin-impregnated fiberglass material are positioned over the grid, another sacrificial layer is applied, and a flat caul plate is placed over the lay-up. The laid-up assembly is placed in a vacuum bag, the bag is evacuated, and the assembly is cured in an autoclave. The sacrificial layers protect the blanket from mold release and outside contamination.

3 Claims, 5 Drawing Figures

METHOD OF FABRICATING A DUCTED BLANKET FOR A ROTOR SPAR

PRIOR APPLICATIONS

This application is a continuation-in-part of our earlier application Ser. No. 169,590, filed July 17, 1980 now abandoned.

BACKGROUND OF THE INVENTION

The present invention relates to helicopter rotor blades of the type having a hollow pressurized spar whose pressure is monitored for detection of leaks caused by flaws in the spar. More specifically, this invention relates to rotor blades of this type in which the hollow spar is covered by an impervious layer, or skin, provided with inner ducting to collect and discharge any gas which would leak from a flaw in the spar.

By the prior art, the skin for such helicopter rotor blades having hollow pressurized spars has been made of impervious fiberglass material which is wrapped, as a "blanket", around the spar. To allow the gases passing through a flaw in the spar to escape, slot-like ducts have been provided in the inner side of this so-called blanket, so that the internal pressure of the spar may fall, to indicate the flaw, such as shown in U.S. Pat. No. 3,765,124, issued to Donald L. Ferris in 1973.

By one conventional process the fiberglass lay-up method is used to fabricate spar blankets. A sheet of fiberglass material is positioned on a table and a plurality of spaced-apart layers of strips of fiberglass are stacked on the fiberglass sheet, leaving slots, which become the venting ducts, between the strips. The fiberglass lay-up is then placed within a vacuum bag and cured in an autoclave. Since each strip of fiberglass must be carefully cut and set into place, this method is quite time-consuming. And, while flat lands (the surfaces between grooves or slots) are obtainable adequate dimension tolerances are difficult to achieve.

As an alternative to the inadequate layup method the use of a grid to form the grooves was attempted. However methods of protecting lands from mold release agents resulted in a spar blanket having rounded corners on the lands which are to contact the rotor blade spar. The rounding of these land corners so reduces the bonding area that a wholly satisfactory bond is not obtained. Rotor blades are subjected to numerous types of loadings, e.g. torsion, flap, thrust, etc. Consequently all of the blade components must be strongly bonded into an integral unit. With this in mind slotted fiberglass blankets have been fabricated by machining slots in a previously-cured blanket. However this process is too time consuming, and, it is almost impossible to keep surfaces to be bonded sufficiently clean. Soiled surfaces weaken the bond, and a weak bond impairs the integrity of the blade.

An object of this invention is to provide a better method of fabricating a fiberglass blanket having a plurality of grooves on one of its sides for use in overlaying and venting the outer surface of a pressure sealed hollow helicopter rotor spar. The process results in a reduction of fabrication time, improves the dimensional tolerances of the blankets, and still satisfies bonding requirements.

SUMMARY OF THE INVENTION

The inventive method herein, of fabricating a fiberglass blanket having a plurality of spaced-apart slots on its inner side, involves the use of sacrificial plies of peelable sheet material to protect surfaces being bonded, both from outside and from release agent contamination. The first sacrificial ply, a plastic film, is positioned on a planar base plate. On this sacrificial ply is placed a thin forming grid of spaced-apart strips corresponding to the slots to be provided in the blanket. The forming grid may be of metal and constructed by chemical milling. Sheets of resin-impregnated thermosetting fiberglass material are applied over the grid and the fiberglass is covered with another sacrificial ply layer. This assembly is then placed in a vacuum bag. The bag is evacuated, and the bagged assembly is heated in an autoclave until the fiberglass material is cured. Heat and pressure cause the fiberglass to conform to the strips of the grid, thereby forming a blanket having slots or grooves corresponding to the strips. When removed, the grid and ply layers are left intact to protect bonding surfaces until bonding to the spar is effected.

DESCRIPTION OF A PREFERRED EMBODIMENT

If a blanket having lands and grooves is used for the detection of cracks in a rotor blade spar, this blanket will be installed between the spar and the shell, and it will carry the shell, ribs, noses, trailing edges, etc. Since the blanket is bonded to the spar, and the shell or skin is bonded to the blanket, the blanket-to-spar bond, as well as the other bonds, must withstand and transmit the loadings, previously described, to which the blade is subjected. Since the blanket is integral with the blade loss of the blanket bond would result in loss of outer blade contour. Moreover because of the grooves the bond must withstand these stresses with much less surface area or bonded surface. Obviously greater bond strength is required. Means must be provided therefore which maximize the bond during the forming operation. By this invention the surface area is increased by the molding process used and the problem of surface contamination has been solved.

Figure 1:
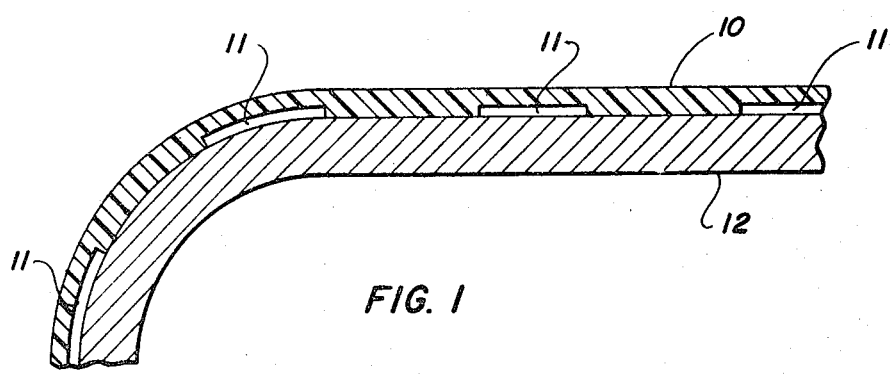
FIG. 1 is a chordwise cross-section of a helicopter rotor spar wrapped with a slotted blanket of the type which may be fabricated according to the present invention.

The present invention is a method for fabricating an impervious blanket 10, such as of fiberglass, having a plurality of spaced-apart slots 11 on its inner side. Such a blanket 10 is utilized for overlaying the outer surface of a hollow helicopter rotor spar 12, such as shown in FIG. 1, with the slots 11 on the inner side of the blanket 10 serving to vent or duct the outer surface of the spar 12, which is internally pressurized or evacuated. The integral pressure of the spar 12 is monitored; a change in pressure indicates a possible flaw in the spar 12. Any flaw which may develop in the spar 12 is not sealed over by the blanket 10; gases leaking through the flaw have a path to the outside of the rotor blade via the slots 11, so that the internal spar pressure may drop, indicating the flaw.

Figure 2:
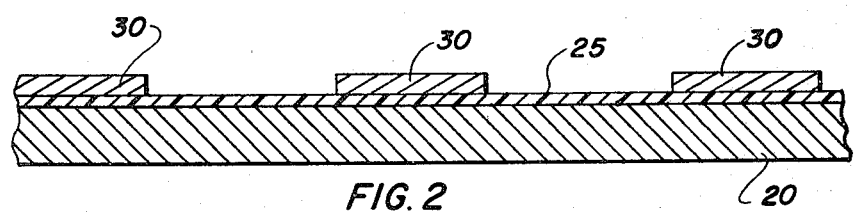
FIG. 2 illustrates an early step in the fabrication method of the present invention, showing a forming grid positioned on a flat plate which had been covered by a sacrificial ply of peelable material.
Figure 3:
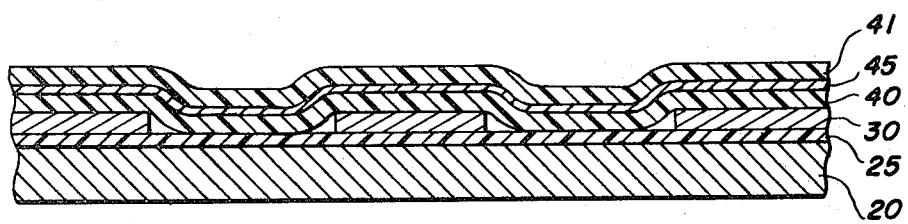
FIG. 3 illustrates later steps in which sheets of resin-impregnated fiberglass are laid up over the forming grid.

Described in detail, in the preferred inventive method, a film sheet or layer of peelable nylon material 25 is first positioned on a base plate 20, as shown in FIG. 2. The base plate 20 may be a table associated with an autoclave, so that during fabrication the table with the built-up fabrication assembly may be conveniently inserted into the autoclave at the appropriate time for curing, as discussed below. In the preferred method, the peelable nylon film utilized is manufactured and sold by Burlington Industrial Fabrics Co., Link Drive, Rockleigh, N.J., under the trademark Burlease #51789. The peelable nylon film 25 does not become part of the blanket, but is a sacrificial ply or layer, utilized to preserve the cleanliness of the assembly and is later removed, as discussed below.

A metal forming grid or tool 30 of spaced-apart strips which correspond to the desired slots 11 in the blanket 10 is positioned on the sacrificial nylon layer 25. The forming grid 30 is preferably of aluminum or stainless steel and may be constructed by the chemical milling process. For best results, the strips of the grid 30 may have slightly angled side walls to facilitate removal from the mold.

In order to prevent from sticking any epoxy resin which may "bleed" out of the fiberglass generally utilized for the blanket material, a liquid mold-release agent, known by the trademark Ram #225 and sold by the Ram Chemical Division of Whittiker Corporation, Gardena, Calif. 90248, is applied to the surfaces of the base plate 20 and forming grid 30.

Once the grid 30 is in place, sheets of fiberglass sheet material 40, 41 are positioned over it. In the preferred method, blanket material of unilateral or woven fiberglass fibers pre-impregnated with an epoxy resin which is cured by heating, manufactured and sold by the 3-M Company, St. Paul, Minn. 55101, is utilized. The thermosettable blanket material, laid up in a "tacky" state, is flexible and preferably "settles" into the slots between the strips of the forming grid 30. For greater strength, several successive plies of the resin-impregnated fiberglass sheets are applied, preferably with the fibers of adjacent plies at angles relative to each other. An appropriate adhesive 45, such as a metal bond adhesive sold in rolls, may be applied between the fiberglass plies. In the preferred method, such rolled metal bond adhesive is supplied by the Normco Material Division of Whittiker Corporation, Los Angeles, Calif.

After all of the fiberglass sheets have been laid up, another sacrificial ply of the peelable nylon film 50 is positioned over the fiberglass, preferably laid out flat, that is, not being allowed to settle between the strips of the grid where the fiberglass plies 40, 41 may have settled.

Figure 4:
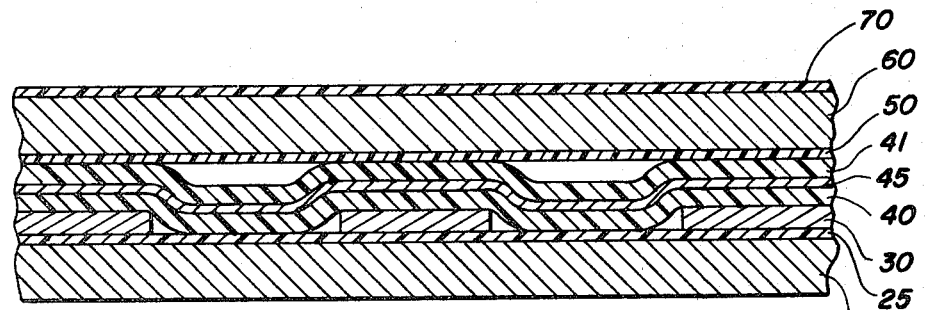
FIG. 4 illustrates still later steps in which the fiberglass is covered by another sacrificial ply of peelable material and a caul plate.

Next, a stainless steel plate, known as a caul plate 60, is positioned on the peelable nylon over the fiberglass, as shown in FIG. 4. The caul plate 60 may be wiped with the mold release agent prior to its placing, to prevent any epoxy resin which may "bleed" onto the cual plate 60 from sticking. Then, the caul plate 60 is covered by another sacrificial layer of peelable nylon 70. This layer is nylon cloth which functions as a stand-off and allows air to flow between the air bag and the caul plate.

In the following step, the fabrication assembly, consisting of the base plate 20 with all of the built-up layers, including the grid 30 and caul plate 60, is placed in a vacuum bag. Where the assembly is built-up on the autoclave table, air-tight bagging material is sealed to the edge of the table, overlaying the assembly, providing an enclosure.

The vacuum bag is evacuated, causing the bag to press the caul plate 60 against the fiberglass sheets 40, 41 and drawing the air from between the lower fiberglass sheet 40 and the grid 30, and from between the adjacent fiberglass sheets 40, 41, so that the sheets 40, 41 substantially conform to the grid 30 and base plate 20. Conforming better to the grid results in flat lands between the grids affording a larger bonding surface.

Finally, the bagged assembly is inserted into an autoclave and heated under pressure for the appropriate time interval. The fiberglass is pressed and/or flows into the slots between the strips of the grid 30, as well as being pressed flat onto the upper side of the strips, thereby having a flat upper surface and a lower surface having slot-like ducts or corrugations. In this thermosetting step, the epoxy resin pre-impregnated within the fiberglass sheets is cured by the heat. When the curing is completed, the bagged assembly is removed from the autoclave, the assembly taken from within the bag, and the caul plate 60 removed, leaving the sacrificial peelable nylon film 50, the grid 30 and sacrificial film 25 in place on the fiberglass, to preserve cleanliness until the blanket is bonded to the spar.

The essence of this invention is the provision of a process which provides maximum bond strength in an environment in which contamination comes both from within and without. Hand lay up processes resulted in rounded corners on lands which are to be bonded to the blade spar. Rounded corners of lands so reduce the bonding area that bond strengths are not satisfactory. As explained the bond strength is highly critical because a poor bond results in loss of outer blade contour and generally loss of the helicopter. Use of vacuum forming techniques such as that described herein result in flat lands, and, therefore greater bonding surface areas. Hence in order to provide maximum bonding surfaces, while still using a grid as the desired method of forming slots 11, vacuum forming was preferred. However vacuum forming requires the use of a mold release agent in order to free the grid 30 and the base and caul plates 20 and 60 from the molded blanket. Thus a contaminant was introduced from within. A method had to be found to protect the lands from the mold release.

Because of the critical nature of the blanket-to-spar bond a technique was also necessary to prevent soiling of land surfaces after the blanket was formed. The sacrificial or peel plies 25 and 50 provided as described herein solve both of these problems. The peelable sacrificial layers prevent contamination of lands by mold release agents during the vacuum forming process. Since the peel ply layers are left on the formed blanket until just prior to bonding they also protect the bonding surfaces from outside soiling. It is preferred to store the formed blanket with the grid 30 in place and to remove it with the sacrificial peel layer 25 immediately prior to bonding.

For more efficient utilization of the autoclave, several grids can be positioned end-to-end to make a single blanket which covers a significant portion of the spar. Furthermore, another blanket fabrication assembly can be built up onto the caul plate of the first assembly, so that several blankets may be cured simultaneously. The cured blankets can then be removed from the forming grids 30, such as by pulling the grid 30 from the base plate 20, which were separated by the peelable film 25, and then pushing the formed-up fiberglass 10 out of the grid 30.

Figure 5:
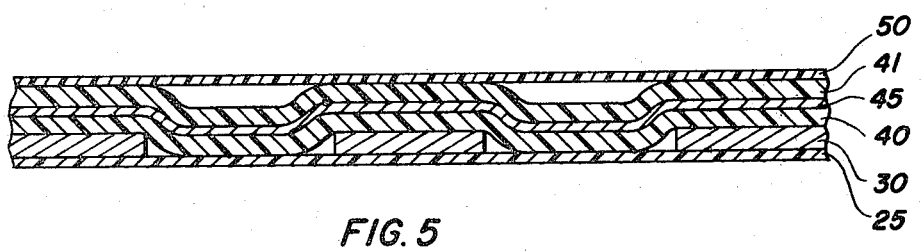
FIG. 5 shows the fiberglass blanket after vacuum bag curing and substantially as it is stored with the plies and grid in place for cleanliness purposes. However the final state of compactness is not shown in order to illustrate clearly the assembled elements of the blanket.

In FIG. 5 a blanket with the sacrificial plies 25 and 50 remaining in place, is shown which after fully compacting can be stored, to be subsequently adhesively bonded, with plies removed, to a rotor blade spar. The sacrificial ply 50 preserves the cleanliness of the blanket 10 until it has been attached to the spar 12, after which it is removed.

The principal advantage of the present method lies in its reduction of the labor and time required to construct the fiberglass blanket of the type having slot-like venting ducts or corrugations on its inner side. Another advantage is that it is possible to hold the desired tolerances for the slots, providing sharp corners and flat sides as desired, which was not easily achieved in previous procedures.

A particular advantage in this method lies in the fact that the perforations in the forming grid may be made by the so-called chemical milling process, in which portions of thin sheet, constructed of aluminum, stainless steel, or the like, may be chemically etched away in a manner similar to silk screening or photo-resist methods. Utilizing this type of process for constructing the forming grid permits excellent repeatability for the blankets, since the same grid may be used a great number of times, and saves a great deal of time.

Modifications of the above preferred method will be apparent. The inventive method may be utilized for producing blankets with other types of curable materials which may be pressed between the perforations in the grid. Other types of sacrificial layers may be utilized. From these examples, other modifications will suggest themselves.

What is claimed is:

1. In the fabrication of impervious fiberglass blankets for spars of rotor blades which are hollow and pressurized with a gas which passes through any flaw in the spar, resulting in an internal pressure drop to indicate the flaw, wherein the blankets are molded with slots on the inner side thereof forming venting ducts for said gases, the improvement whereby spar-to-blanket adhesion is enhanced, comprising, for vacuum forming between a base plate and a caul plate, preparing over a grid of spaced-apart strips a plurality of sheets of flexible fiberglass pre-impregnated with a thermosetting resin, the grid when removed forming the slots in the molded blanket, inserting between the grid and the base plate and between the fiberglass and the caul plate planar films of peelable material, under vacuum forming conditions heat setting the thermosetting resin, causing the blanket material to conform substantially to the grid so that the strips of the grid provide the spaced-apart slots on the inner side of the cured blanket material, and causing the planar film between the fiberglass and the caul plate to adhere to the top of the resulting blanket and the planar film between the fiberglass in the slots of the grid and the base plate to adhere to the bottom blanket surfaces, protecting said surfaces from mold release and from outside contamination until the blanket is bonded to the spar and internal rotor blade surfaces when the planar films, being sacrificial, are removed, thereby maximizing the bond between the spar and the blanket and between the blanket and rotor blade internal surfaces.

2. The process of claim 1 wherein the grid and the planar film remain on the bottom blanket surface and are removed when the blanket is bonded to the spar.

3. The process of claim 2 wherein the base plate and caul plate with the sheets, grid, and planar film therebetween are placed in a vacuum bag, wherein the bag is evacuated, and wherein the bag is heated in an autoclave to cure the resin.

* * * * *